Figure 1:
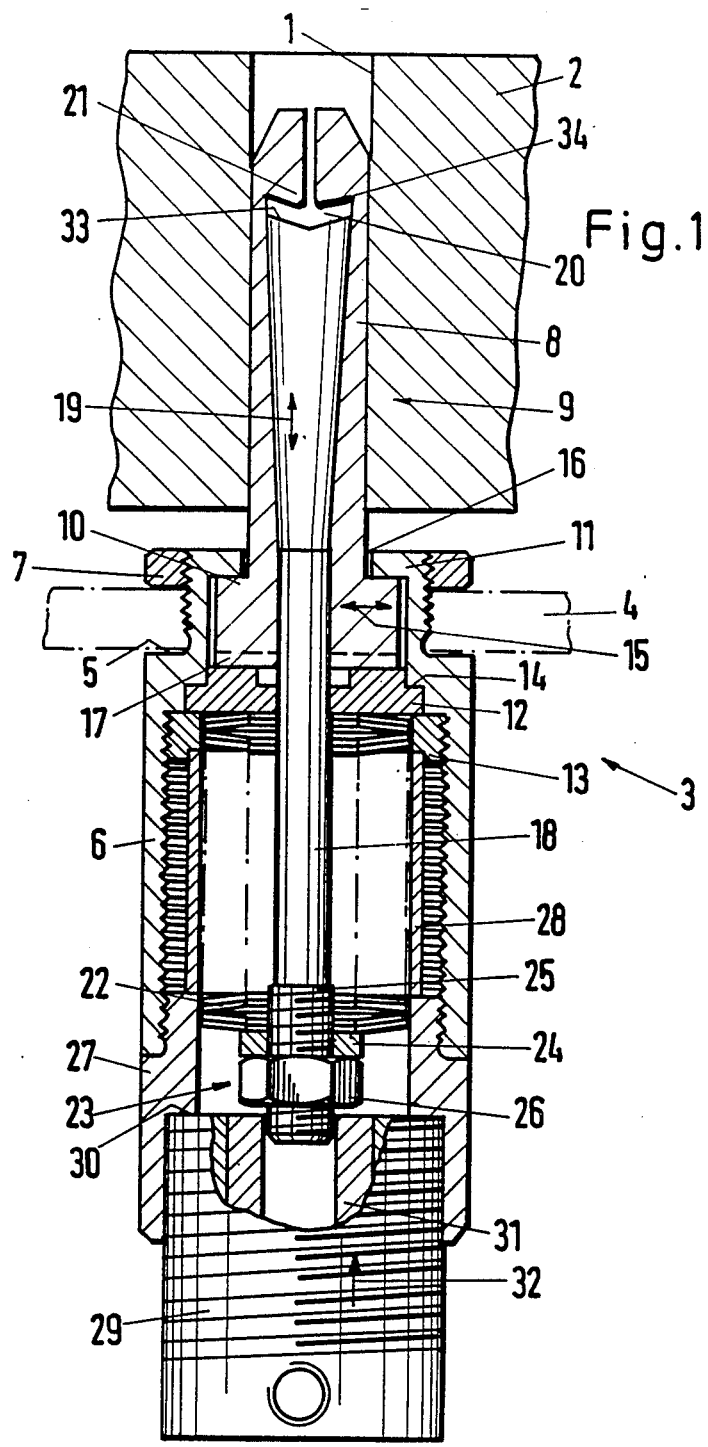

United States Patent [19]

Haller et al.

[11] Patent Number: 4,725,162

[45] Date of Patent: Feb. 16, 1988

[54] CLAMPING ELEMENT FOR FIXATION IN A BORE OF A STRUCTURAL PART

[75] Inventors: Hans Haller, Mannheim; Fritz Ziegelmeyer, Bad-Schönborn, both of Fed. Rep. of Germany

[73] Assignee: Brown, Boveri Reaktor GmbH, Mannheim, Fed. Rep. of Germany

[21] Appl. No.: 11,730

[22] Filed: Feb. 6, 1987

[30] Foreign Application Priority Data

Feb. 7, 1986 [DE]  Fed. Rep. of Germany ....... 3603801

[51] Int. Cl.⁴ ............................ B65G 3/24; F16B 2/02
[52] U.S. Cl. .................................. 403/290; 294/86.25; 165/11.2
[58] Field of Search ........................ 403/290; 269/48.1; 279/2 R; 165/11.2; 294/86.25

[56] References Cited

U.S. PATENT DOCUMENTS

| | | | |
|---|---|---|---|
| 1,728,136 | 9/1929 | Power | 294/86.25 X |
| 1,728,544 | 9/1929 | Hauck | 294/86.25 X |
| 3,527,494 | 9/1970 | Young | 294/86.25 |
| 4,585,203 | 4/1986 | Monne et al. | 165/11.2 X |
| 4,649,989 | 3/1987 | Vermaat et al. | 279/2 R |

*Primary Examiner*—Andrew V. Kundrat
*Attorney, Agent, or Firm*—Herbert L. Lerner; Laurence A. Greenberg

[57] ABSTRACT

A clamping element for fixation in a bore of a structural element and for carrying a load includes a clamping sleeve formed of a plurality of partial shells and having a central axis, a clamping bolt vertically movable in the clamping sleeve, the partial shells and the clamping bolt having mutually cooperating spreading surfaces converging and tapering toward the load, the clamping bolt permanently subjecting the partial shells to an automatically acting clamping force, the clamping bolt being axially movable to counteract and relieve the clamping force, the partial shells and the clamping bolt having surfaces adjacent the spreading surfaces converging obliquely toward the central axis and forcing the partial shells into a disengaged position.

6 Claims, 2 Drawing Figures

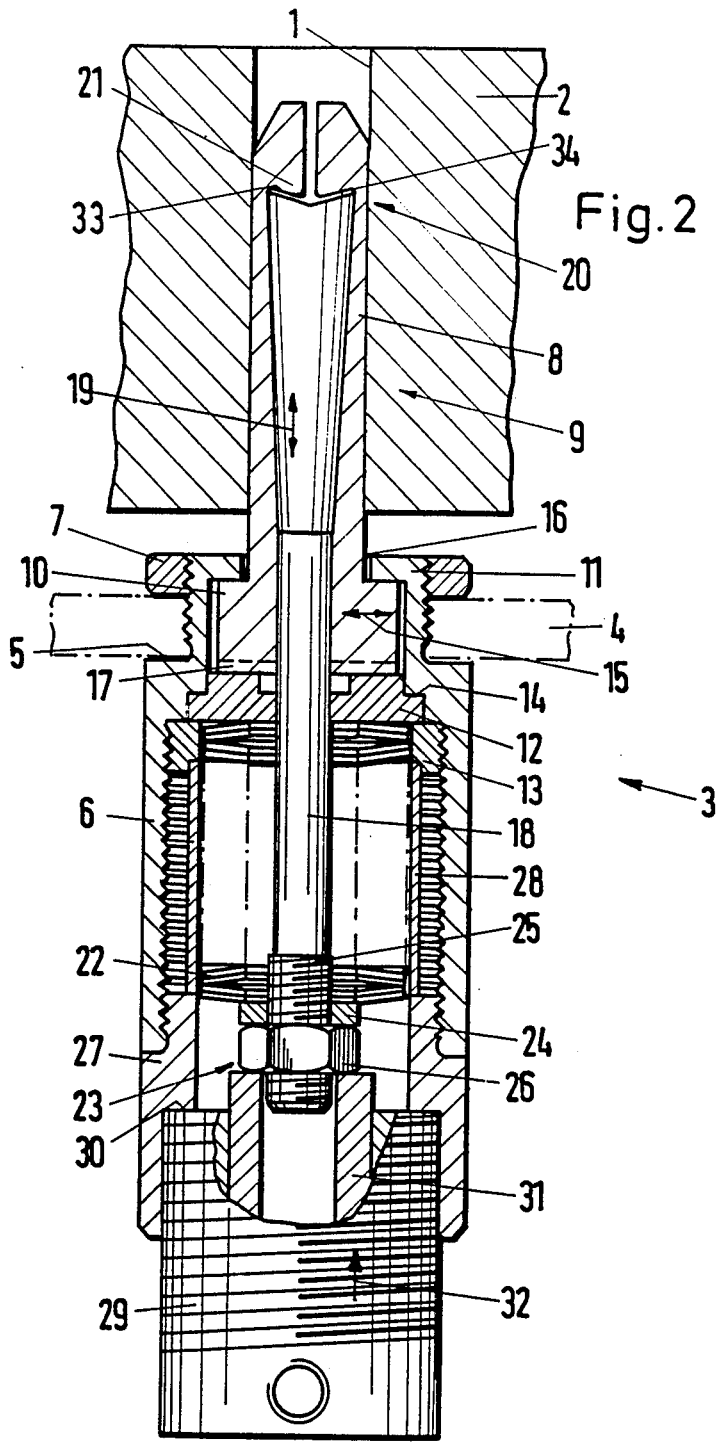

CLAMPING ELEMENT FOR FIXATION IN A BORE OF A STRUCTURAL PART

The invention relates to a clamping element for fixation in a bore of a structural part having a load carried by the clamping element, including a clamping sleeve having a plurality of partial shells, in the interior of which a clamping bolt is movable in the vertical direction, the partial shells and the clamping bolt having cooperating spreading faces.

A clamping element of this type is known from German Published, Non-Prosecuted Application DE-OS No. 33 00 460, corresponding to allowed U.S. application Ser. No. 569,563, filed Jan. 9, 1984, now U.S. Pat. No. 4,649,989. In that device the axial movement of the clamping bolt is converted from a rotational movement by means of a compressed air motor. The conversion from the rotational to the axial movement is subject to severe losses due to wear and friction. Furthermore, mistakenly actuating the compressed air motor can cause unintentional loosening of the clamping position and therefore can cause the load supported by the clamping element to fall down. In that prior art device, a separate structural component is required for reinforcing the loosening process, which also leads to an unsuitable lenghtening of the clamping element.

It is accordingly an object of the invention to provide a clamping element for fixation in a bore of a structural part, which overcomes the hereinafore-mentioned disadvantages of the heretofore-known devices of this general type, which will not permit its load to fall and which ensures reliable returning of the partial shells to their relieved position.

With the foregoing and other objects in view there is provided, in accordance with the invention, a clamping element for fixation in a bore of a structural element and for carrying a load, comprising a clamping sleeve formed of a plurality of partial shells and having a central axis, a clamping bolt or mandrel or tapered plug vertically movable in the interior of the clamping sleeve, the partial shells and the clamping bolts having mutually cooperating spreading surfaces converging and tapering toward the load, the clamping bolt permanently subjecting the partial shells to an automatically acting clamping force, and means for axially moving the clamping bolt to counteract and relieve or neutralize the clamping force, the partial shells and the clamping bolt having surfaces adjacent the spreading surfaces converging obliquely toward the central axis and forcing the partial shells into a disengaged position.

The desired effect is attained in a simple manner, by automatic means and without lengthening the clamping element portion that protrudes into a pipe.

In accordance with another feature of the invention, there is provided a housing having a protrusion, the partial shells having a collar with end surfaces retaining the partial shells in the housing, one of the end surfaces resting on the protrusion, a guide plate resting on the other of the end surfaces, and means for fixing the guide plate relative to the housing while maintaining tolerance between the protrusion and the collar. This assures secure retension and exact guidance of the partial shells transverse to the axial direction of the clamping element.

In accordance with a further feature of the invention, there is provided a tongue and groove connection between the guide plate and the other end surface of the collar permitting sliding movement therebetween. This is done in order to make the guidance more precise.

In accordance with an added feature of the invention, the clamping bolt has one end at which the spreading surfaces are disposed and another end opposite the one end, and including a plate spring packet, an abutment disposed at the other end of the clamping bolt having one side facing the plate spring packet and another side opposite the one side, the plate spring packet being disposed between the abutment and the guide plate, and a cylinder joined to the housing having a hollow piston for engaging the other side of the abutment and relieving the force of the plate spring packet. The clamping force automatically acting upon the partial shells and the relieving or neutralization of this force are preferably attained in this way.

Accordingly, the clamping force is generated and relieved or neutralized by completely separate structural parts. The plate spring packet acts automatically and its clamping force can be relieved or neutralized only if the hollow piston cylinder is activated. Unintentional actuation of the hollow piston is unlikely, because the only task it has to perform is the function of relaxation.

In accordance with an additional feature of the invention, the abutment is moveable relative to the clamping bolt for adjusting the force of the plate spring packet.

In accordance with an a concomitant feature of the invention, there is provided a guide sleeve for the plate spring packet, a threaded ring disposed between the guide sleeve and the guide plate, and a connecting element disposed between the housing and the cylinder for clamping the guide sleeve with respect to the threaded ring. This is done for protecting the plate spring packet.

Other features which are considered as characteristic for the invention are set forth in the appended claims.

Although the invention is illustrated and described herein as embodied in clamping element for fixation in a bore of a structural part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, longitudinal-sectional view of a clamping element according to the invention in the clamping position thereof; and FIG. 2 is a view similar to FIG. 1 of the clamping element with the tension relieved.

Referring now to the figures of the drawings in detail and first, particularly, to FIG. 1 thereof, there is seen a structural part 2 having a bore 1 in which a clamping element 3 is anchored. The clamping element 3 serves to retain a load 4 shown in phantom, relative to the structural part 2. The load 4 is supported on a shoulder 5 of a housing 6 and is secured by a nut 7. A clamping sleeve 9 formed of partial shells in the form of half shells 8, has a collar 10 having an upwardly facing end surface bordering on a protrusion 11 of the housing 6 and a downwardly facing end surface supported on a guide plate 12. The guide plate 12 can be placed against a shoulder 14 of the housing by a threaded ring 13 which can be screwed into the housing 6. The thickness of the guide plate 12 and the height of the collar 10 are adapted to one another in such a way that there is still sufficient play between the protrusion 11 and the adjoining end of the collar 10 to allow movement of the half shells in the direction of an arrow 15 within an annular gap 16 between the clamping sleeve 9 and the housing at the passageway therethrough. In order to ensure exact guidance, a tongue and groove connection 17 which allows the sliding movement is provided between the guide plate 12 and the lower end of the collar 10. A clamping bolt or tapered plug 18 that passes through the guide plate 12 protrudes into the interior of the clamping sleeve 9 and is movable in axial direction 19 relative to the clamping sleeve 9 within an open space 20 between an upper surface 33 of the clamping bolt 18 and a lower surface 34 of an offset 21 of the half shells 8. The clamping bolt 18 together with the clamping sleeve 9, is movable only in the relieved or relaxed position shown in FIG. 2. Complementary spreading faces between the half shells 8 and the spreading bolt 18 are formed in such a way that they taper in the direction toward the load 4. As a result, it is possible to exert an automatically acting clamping force upon the half shells 8. A plate spring packet 22 which is disposed between the guide plate 12 and an abutment 23 engaging the free end of the clamping bolt 18, is used to generate this clamping force. The abutment 23 is formed of a disc 24 facing toward the plate spring packet and a nut 26 screwed onto a thread 25 of the clamping bolt 18. The required clamping force can be applied and adjusted by adjusting the nut 26. An intermediate element 27 is screwed into the lower end of the housing 6 and supports a guide sleeve 28 that extends as far as the threaded ring 13 and encompasses the plate spring packet. A cylinder 29 without a piston rod is screwed into a downwardly pointing end of the intermediate element 27 until it rests against a shoulder 30 of the intermediate element 27.

The clamping element 3, which is already in the clamping position thereof before it is introduced into the bore 1, is brought into the relieved or relaxed position thereof by the movement of a trunk or hollow piston 31 in the direction of an arrow 32, and in this condition it can be introduced into or removed from the bore 1. In the process, the trunk piston 31 comes into contact with an end of the nut 26 facing it, an while overcoming the force of the plate spring packet 22 it displaces the clamping bolt 18 until the clamping bolt comes to rest against the offset 21 at the upper end end of the open space 20 above the half shells 8 of the clamping sleeve 9, as shown in FIG. 2. The surfaces 33 at the upper end of the clamping bolt 18, which are obliquely inwardly inclined by approximately 15 degrees, effect a movement of the half shells 8 toward one another after coming into contact with the complementarily constructed surfaces 34 of the offset 21 at the free space 20. The half shells 8 are thereby automatically driven together by a few tenths of a millimeter to such an extent that unproblematic insertion and removal of the clamping element into and out of the bore 1 is possible.

The foregoing is a description corresponding in substance to German Application P No. 36 03 801.6, dated Feb. 7, 1986, the International priority of which is being claimed for the instant application, and which is hereby made part of this application. Any material discrepancies between the foregoing specification and the aforementioned corresponding German application are to be resolved in favor of the latter.

We claim:

1. Clamping element for fixation in a bore of a structural element and for carrying a load, comprising a clamping sleeve formed of a plurality of partial shells and having a central axis, a clamping bolt vertically movable in said clamping sleeve, said partial shells and said clamping bolt having mutually cooperating spreading surfaces converging and tapering toward the load, said clamping bolt permanently subjecting said partial shells to an automatically acting clamping force, and means for axially moving said clamping bolt to counteract and relieve said clamping force, said partial shells and said clamping bolt having surfaces adjacent said spreading surfaces converging obliquely toward said central axis and forcing said partial shells into a disengaged position.

2. Clamping element according to claim 1, including a housing having a protrusion, said partial shells having a collar with end surfaces retaining said partial shells in said housing, one of said end surfaces resting on said protrusion, a guide plate resting on the other of said end surfaces, and means for fixing said guide plate relative to said housing while maintaining tolerance between said protrusion and said collar.

3. Clamping element according to claim 2, including a tongue and groove connection between said guide plate and said other end surface of said collar permitting sliding movement therebetween.

4. Clamping element according to claim 2, wherein said clamping bolt has one end at which said spreading surfaces are disposed and another end opposite said one end, and including a plate spring packet, an abutment disposed at said other end of said clamping bolt having one side facing said plate spring packet and another side opposite said one side, said plate spring packet being disposed between said abutment and said guide plate, and a cylinder joined to said housing having a hollow piston for engaging said other side of said abutment and relieving the force of said plate spring packet.

5. Clamping element according to claim 4, wherein said abutment is moveable relative to said clamping bolt for adjusting the force of said plate spring packet.

6. Clamping element according to claim 4, including a guide sleeve for said plate spring packet, a threaded ring disposed between said guide sleeve and said guide plate, and a connecting element disposed between said housing and said cylinder for clamping said guide sleeve with respect to said threaded end.

* * * * *